United States Patent [19]
van Spronsen et al.

[11] Patent Number: 6,073,910
[45] Date of Patent: Jun. 13, 2000

[54] COUPLING FOR CONNECTING TWO PIPE PARTS

[75] Inventors: Cornelis W. van Spronsen, Zoetermeer; Diederik Kraan, Apeldoorn; Cornelis M. Beijersbergen van Henegouwen, Bruchem, all of Netherlands

[73] Assignee: Flamco B.V., Gouda, Netherlands

[21] Appl. No.: 09/227,166

[22] Filed: Jan. 7, 1999

[30] Foreign Application Priority Data

Jan. 30, 1998 [NL]  Netherlands ............................ 1008174

[51] Int. Cl.$^7$ .................................................. F16L 29/00
[52] U.S. Cl. ......................................... 251/149.9; 251/208
[58] Field of Search .............................. 251/149.9, 149.5, 251/149.2, 208; 137/614.06, 625.31

[56] References Cited

U.S. PATENT DOCUMENTS

| | | |
|---|---|---|
| 1,850,879 | 3/1932 | Hunt . |
| 3,589,673 | 6/1971 | Cruse . |
| 4,613,112 | 9/1986 | Phlipot et al. . |
| 4,946,134 | 8/1990 | Orlandi .................................. 251/208 |
| 5,002,254 | 3/1991 | Belisaire et al. ...................... 251/149.9 |
| 5,595,217 | 1/1997 | Gillen et al. ...................... 251/149.9 X |
| 5,630,570 | 5/1997 | Lacroix et al. ....................... 251/149.9 |
| 5,904,302 | 5/1999 | Brown .............................. 251/149.9 X |

FOREIGN PATENT DOCUMENTS 0 719 973 A1  7/1996  European Pat. Off. .

*Primary Examiner*—Kevin Lee
*Attorney, Agent, or Firm*—Mark S. Leonardo; Brown, Rudnick, Freed and Gesmer, P.C.

[57] ABSTRACT

A coupling for connecting a first pipe part and a second pipe part comprises a first coupling part and a second coupling part, a shut-off valve arranged in the first coupling part, and locking structure. The locking structure can move with respect to one another between an unlocked position and a locked position, in the manner of a bayonet coupling. An actuator for actuating the shut-off valve is arranged in the second coupling part. The locking structure and the actuator are designed in such a manner that the shut-off valve can only be opened by means of the actuator when the locking structure is in the locked position, and in that the coupling can only be uncoupled when the shut-off valve is in the closed position. The actuator and the locking structure can be actuated separately.

5 Claims, 8 Drawing Sheets

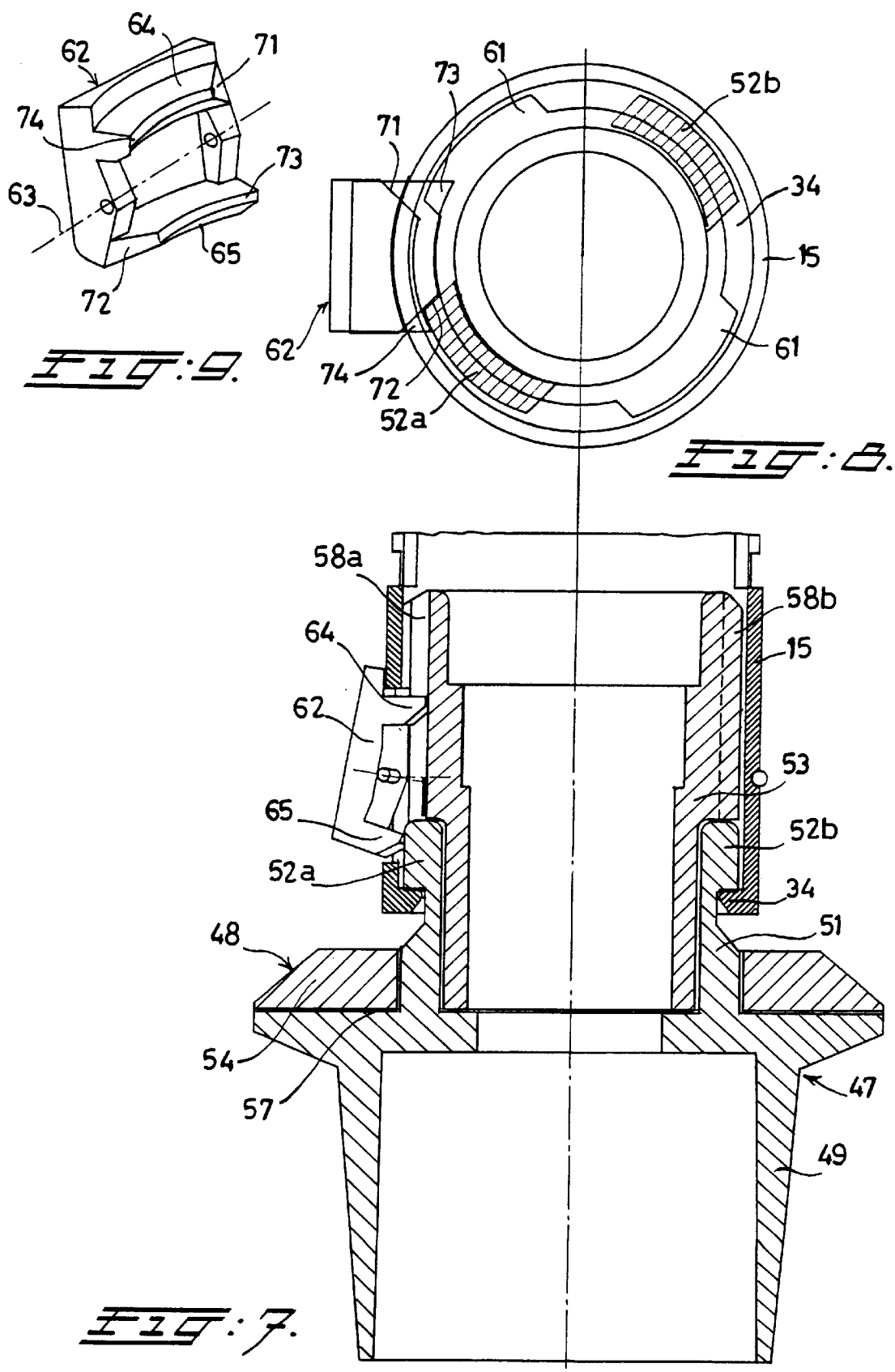

6,073,910

COUPLING FOR CONNECTING TWO PIPE PARTS

BACKGROUND OF THE INVENTION

The invention relates to a coupling for connecting a first pipe part and a second pipe part, comprising a first coupling part which is to be connected to the first pipe part and a second coupling part which is to be connected to the second pipe part, which two coupling parts each have a through passage and can be coupled together in order to bring about a releasable connection between pipe parts which are connected thereto, the through passages in the coupling parts adjoining one another coaxially, and further comprising:

shut-off means, which are arranged in at least one of the two coupling parts, for opening and shutting off the through passage in the coupling part in question, locking means comprising a first locking member, which is arranged in the first coupling part, and a second locking member, which is arranged in the second coupling part, which locking members are able to interact with one another in order to lock the two coupled-together coupling parts in the axial direction with respect to one another, and are able to move with respect to one another between an unlocked position, in which the two coupling parts can be separated from one another, and a locked position, in which the two coupling parts are coupled together and are fully locked together in the axial direction, via an intermediate position, in which the two coupling parts are coupled together and the locking between them is just active, actuating means, which are arranged in at least one of the two coupling parts, for actuating the shut-off means, the locking means and the actuating means being designed in such a manner that the through passage in that coupling part in which the shut-off means are arranged can only be opened by means of the actuating means and the shut-off means when the locking means are in the intermediate position or the locked position or between these positions, and the locking means can only be moved out of the intermediate position into the unlocked position when the actuating means and the shut-off means are in the position in which the through passage in the relevant coupling part is shut off.

A coupling of this nature is known from EP-A-0,719,973. In this known coupling, the shut-off means are actuated by the locking means via the actuating means. In the coupled position of the two coupling parts, the locking means are in engagement with the actuating means, which actuating means are entirely enclosed in the coupling part in which the shut-off means are arranged.

The known coupling has the drawbacks that actuation of the shut-off means is directly coupled to the actuation of the locking means and that it is not possible to see directly from outside the extent to which the through passage in the coupling is open or closed. This fact represents a drawback particularly during unlocking and uncoupling.

SUMMARY OF THE INVENTION

The object of the invention is to eliminate the drawbacks of the known coupling.

This object is achieved by the fact that the actuating means and the locking means can be actuated separately.

The coupling according to the invention has the advantage that, during coupling, firstly the two coupling parts can be coupled to one another and locked with respect to one another, and then the through passage in the coupling can be opened. Moreover, in the coupled position of the coupling, the through passage can be opened or closed as desired without having to change the locking condition of the coupling. In short, the coupling function and the shut-off function of the coupling are separate from one another. Moreover, it is possible to tell from the position of the actuating means whether the through passage is open or closed.

The invention will be explained in more detail with reference to the following description of an exemplary embodiment of the coupling according to the invention and with reference to the drawings.

BRIEF DESCRIPTION OF THE DRAWINGS

FIGS. 7–9 show first blocking means of the coupling shown in FIG. 1.

DESCRIPTION OF PREFERRED EMBODIMENTS

Figure 1:
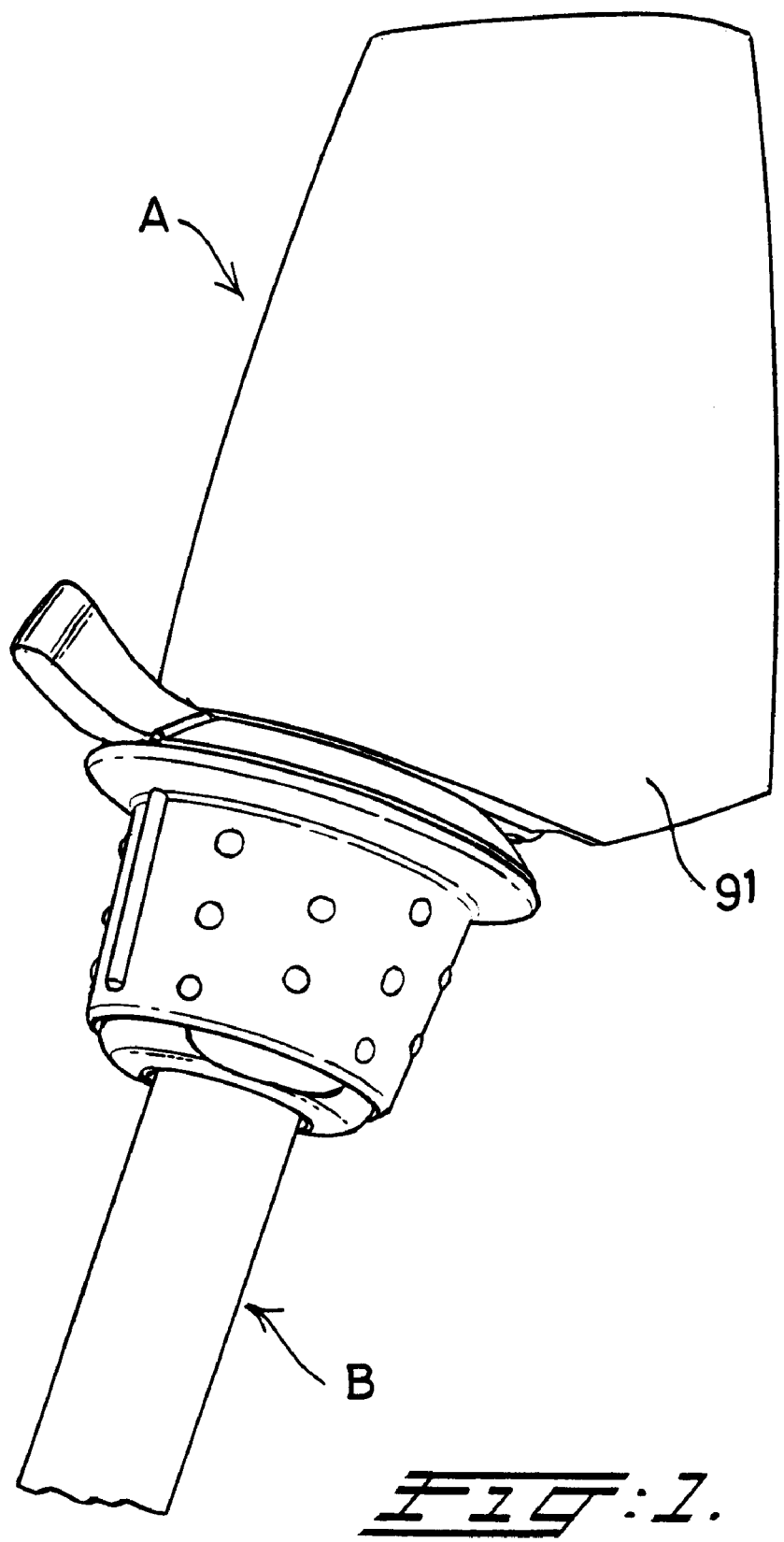
FIG. 1 shows a perspective view of the outside of a particular embodiment of the coupling according to the invention, in the coupled position.
Figure 2:
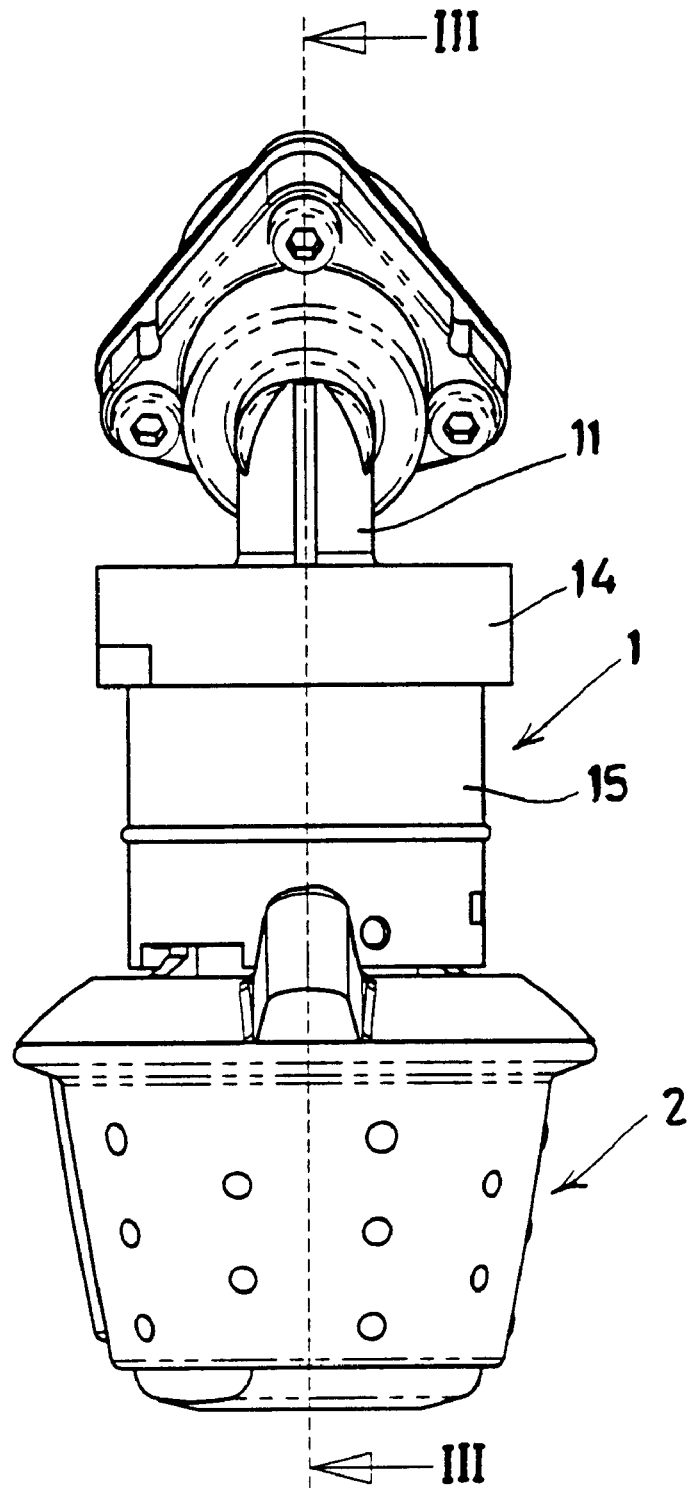
FIG. 2 shows a front view of the coupling shown in FIG. 1, without the cover cap.

The coupling according to the invention which is shown in the figures is intended to connect two pipe parts through which a medium, such as water, gas or possibly fluidized powder, is able to flow. In particular, the coupling is intended to connect a water or gas connection point A, which is fixed on a wall, to an often flexible water or gas pipe B or, if appropriate, to a water outlet which is not provided with a pipe. It is important that the coupling always ensures that, on the one hand, passage from one pipe part to the other pipe part can only take place when the two pipe parts are fixedly connected to one another and, on the other hand, that the two pipe parts can only be separated from one another when the passage from one pipe part to the other pipe part is shut off.

The embodiment of the coupling according to the invention which is illustrated in the figures comprises a first coupling part 1, which is to be connected to a first pipe part, and a second coupling part 2, which is to be connected to a second pipe part.

The first coupling part 1 comprises a housing 11 in which a through passage 12 is formed. In the embodiment illustrated, the housing 11 is connected, by means of screws, to a fitting part 13, which can be fixed to a wall. A fixed gas or water pipe can be connected to the fitting part 13. The fitting part 13 may (as shown in the drawing) be designed for connection to a pipe in the wall or for connection to a pipe on the wall (not shown).

With the aid of a nut 14, a bush-like first locking member 15 is attached to the housing 11. This bush-like locking member 15 forms part of locking means which are to be described in more detail below.

The first coupling part 1 furthermore comprises a first, male pipe connection part 16 which is provided with radially protruding projections 16a which are enclosed between the bush-like locking member 15 and the housing 11, so that the pipe connection part 16 is fixedly connected to the housing 11. The pipe connection part 16 is provided with a through passage 17 which lies in line with the through passage 12 in the housing 11. Sealing rings 18 and 19 are arranged around the pipe connection part 16.

Figure 6:
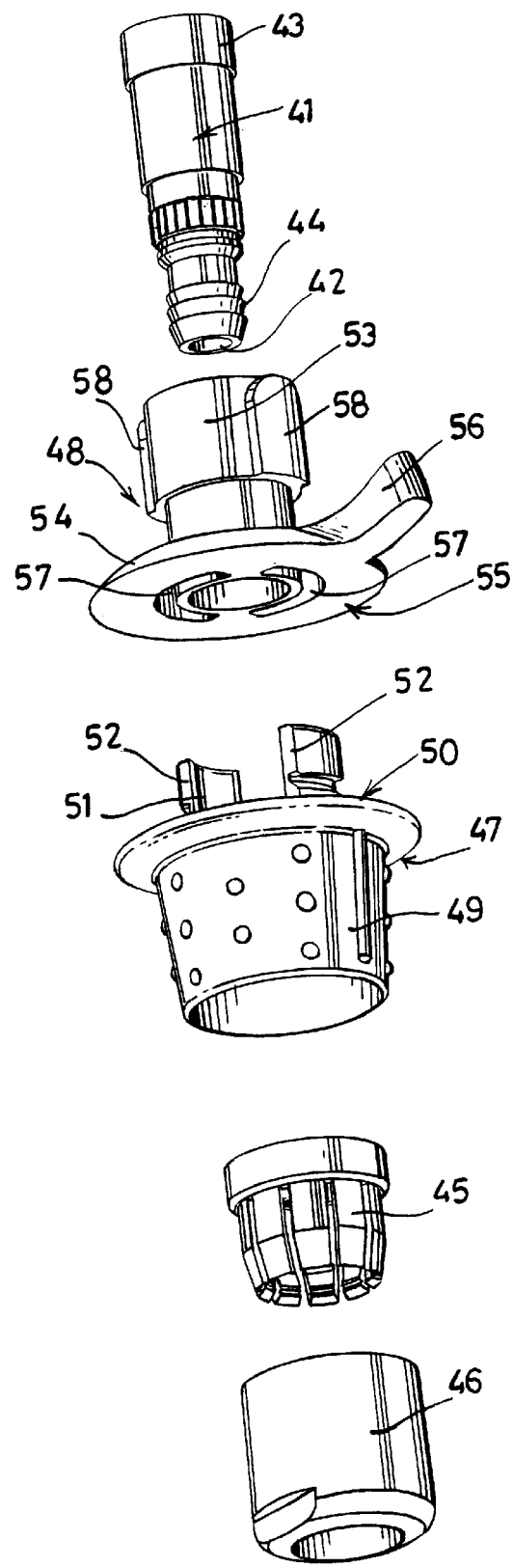

Shut-off means 20 for opening and shutting off the through passage 12, 17 in the coupling part 1 are accommodated between the pipe connection part 16 and the housing 11. These shut-off means 18 are formed by a disc valve with two planar discs 21 and 22 (see FIG. 6) which can be rotated with respect to one another and are provided with through openings 23 and 24, respectively. To open the through passage 12, 17, the discs 21, 22 can be rotated with respect to one another in such a manner that the openings 23 and 24 lie opposite one another. To shut off the through passage 12, 17, the discs 21 and 22 can be rotated with respect to one another in such a manner that the openings in one disc are shut off by the other disc. The discs 21 and 22 are made, for example, from ceramic material.

The disc 21 is accommodated in a chamber 25 in the housing 11, a sealing ring 26 being accommodated between the disc 21 and the chamber 25. The disc 21 is provided with radially protruding projections 27 which engage in cutouts in the housing 11, in such a manner that the disc 21 cannot be rotated with respect to the housing 11.

The disc 22 is accommodated in a holder 28, a sealing ring 29 also being accommodated between the disc 22 and the holder 28. The disc 22 is likewise provided with radial projections 30 which engage in cutouts 31 in the holder 28, so that the disc 22 cannot be rotated with respect to the holder 28.

The holder 28 can rotate with respect to the housing 11. The holder 28 is provided with radially protruding projections 32 which, in the coupled position of the coupling, are in engagement with actuating means for the shut-off means 20 formed by the discs 21 and 22.

It is not necessarily the case that the shut-off means are designed as a disc valve. Other types of valves may also be used.

In another possible embodiment (not shown), the holder may be fixedly connected to the first, male pipe connection part 16, which in that case, of course, must be designed so that it can rotate with respect to the housing 11.

As indicated in the drawing, a blocking member 33, which forms part of first blocking means, the function of which will be explained in more detail below, may be arranged on the bush-like locking member 15.

The second coupling part 2 comprises a second, female pipe connection part 41, in which a through passage 42 is formed. One end 43 of the pipe connection part 41 fits around the first pipe connection part 16 of the first coupling part 1. The other end 44 of the pipe connection part 41 fits into a flexible pipe or hose which is clamped onto the end 44 with the aid of a conventional clamping ring 45 and a clamping bush 46 fitted over the latter. In another embodiment (not shown), the second coupling part 2 may be designed for connection to a fixed or rotatable outlet.

The second coupling part 2 furthermore comprises a second locking member 47 which is arranged coaxially on the second pipe connection part 41, and an actuating member 48, which is likewise arranged coaxially with respect to the second pipe connection part, for the purpose of actuating the shut-off means 20 in the first coupling part 1.

The second locking member 47 is designed as a rotatable cap 49 which engages over the clamping bush 46, can rotate around the second pipe connection part 41 and has a substantially flat end face 50, which cap 49 is provided with two axial fingers 51 which extend from the flat end face 50 and are each provided at their end with locking projections 52 which protrude radially outwards. In the coupled position of the two coupling parts 1 and 2, the locking projections 52 are able to interact with a locking edge 34, which protrudes radially inwards, of the first locking member 15 of the first coupling part 1, in order to lock the two coupled-together coupling parts 1 and 2 in the axial direction with respect to one another.

The actuating member 48 is designed as a bush 53 which can be rotated coaxially around the second pipe connection part 41 and is provided with a flange 54 with a substantially flat end face 55. The edge face 55 of the actuating member 48 bears against the flat end face 50 of the second locking member 47. The flange 54 is provided with a radially protruding actuating arm 56.

The fingers 51 of the locking member 47 fit through slots 57 in the flange 54 of the actuating member 48 and bear against the outer circumference of part of the bush 53. The slots 57 are in the shape of part of a ring. Owing to this design, the second locking member 47 and the actuating member 48 can be rotated through a limited angular range with respect to one another.

The bush 53 is provided on the outside with two longitudinal ribs 58 which, in a certain position of the locking member 47 with respect to the actuating member 48, lie in line with the projections 52 of the locking member 47.

The free end edge 59 of the bush 53 is provided with two cutouts 60 which lie diametrically opposite one another. In the coupled position of the two coupling parts 1 and 2, the radially protruding projections 32 of the holder 28 of the disc 22 of the shut-off means 20 engage in the cutouts 60. As a result, in the coupled position of the two coupling parts 1 and 2, the disc 22 can be rotated with respect to the fixed disc 21 by means of the actuating member 48, for the purpose of opening and shutting off the through passage 12, 17 in the first coupling part 1.

For the second locking member 47 and the actuating member 48 to function correctly, it is not necessary for them to be designed as illustrated in the drawing. Other designs are possible, provided that the functions of the two components are decoupled in the sense of the invention.

When coupling together the first coupling part 1 and the second coupling part 2, the two coupling parts 1 and 2 are pushed into one another, the second, female pipe connection part 41 engaging over the first, male pipe connection part 16, in such a manner that the through passages 17 and 42 in the pipe connection parts 16 and 41 adjoin one another coaxially. The seal between the two pipe connection parts 16 and 41 is provided by the sealing rings 18 and 19. The coupled position of the two coupling parts 1 and 2 is illustrated in FIG. 3.

Figure 5:
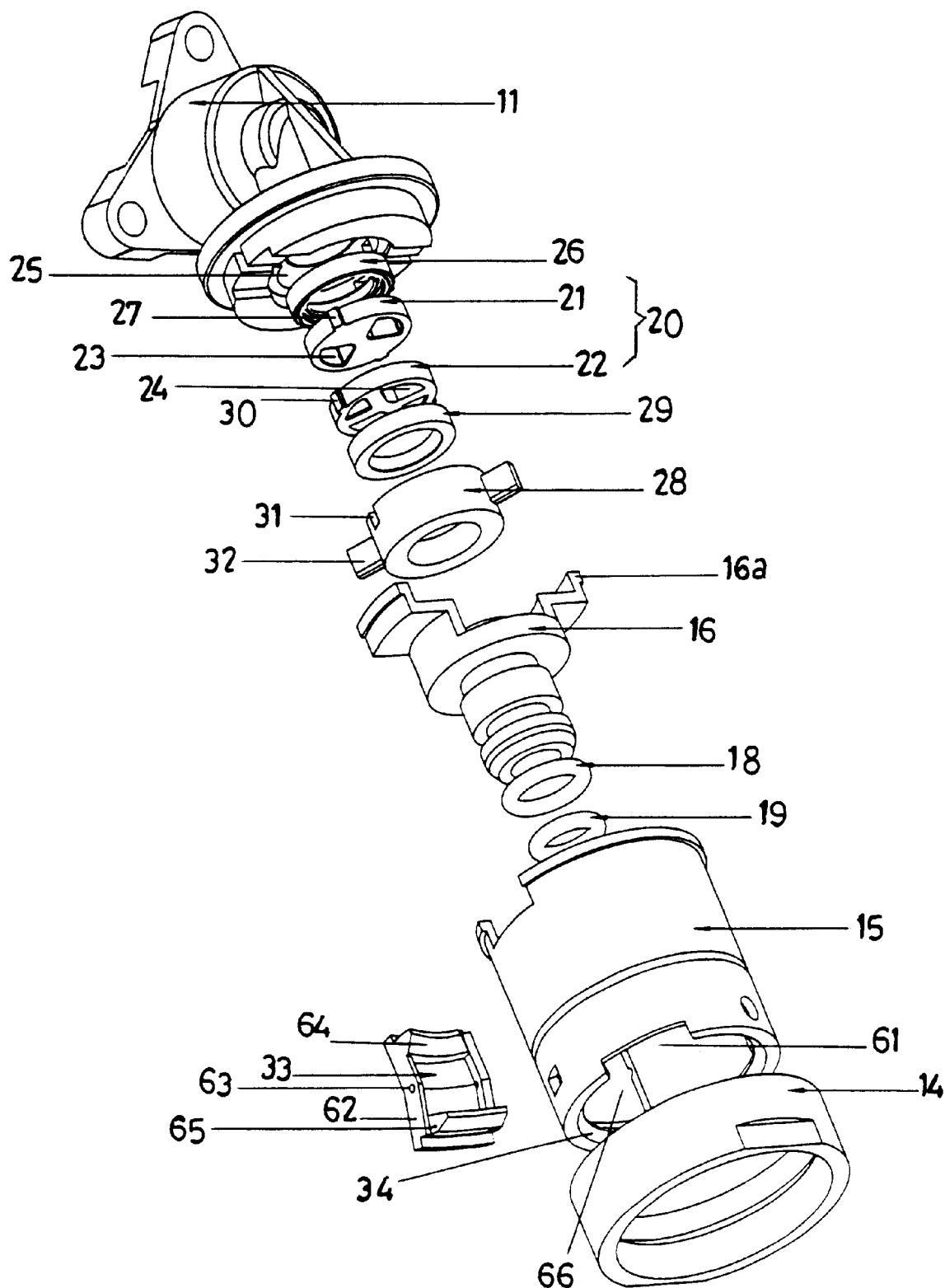
FIGS. 5 and 6 show a perspective view of the various components of the two coupling parts which are illustrated in FIG. 4.

When fitting the second coupling part 2 into the first coupling part 1, the locking projections 52 on the fingers 51 of the second locking member 47 lie in line with the ribs 58 on the bush 53 of the actuating member 48. The mutually aligned ribs 58 and projections 52 are pushed through cutouts 61 (see FIG. 5) in the inwardly protruding locking edge 34 of the bush-like first locking part 15. In this way, when fitting the second coupling part 2 into the first coupling part 1, the second coupling part 2 is guided in the direction of rotation with respect to the first coupling part 1, in such a manner that the projections 32 of the holder 28 in the first coupling part 1 engage in the cutouts 60 in the free end edge 59 of the actuating member 48.

Figure 3:
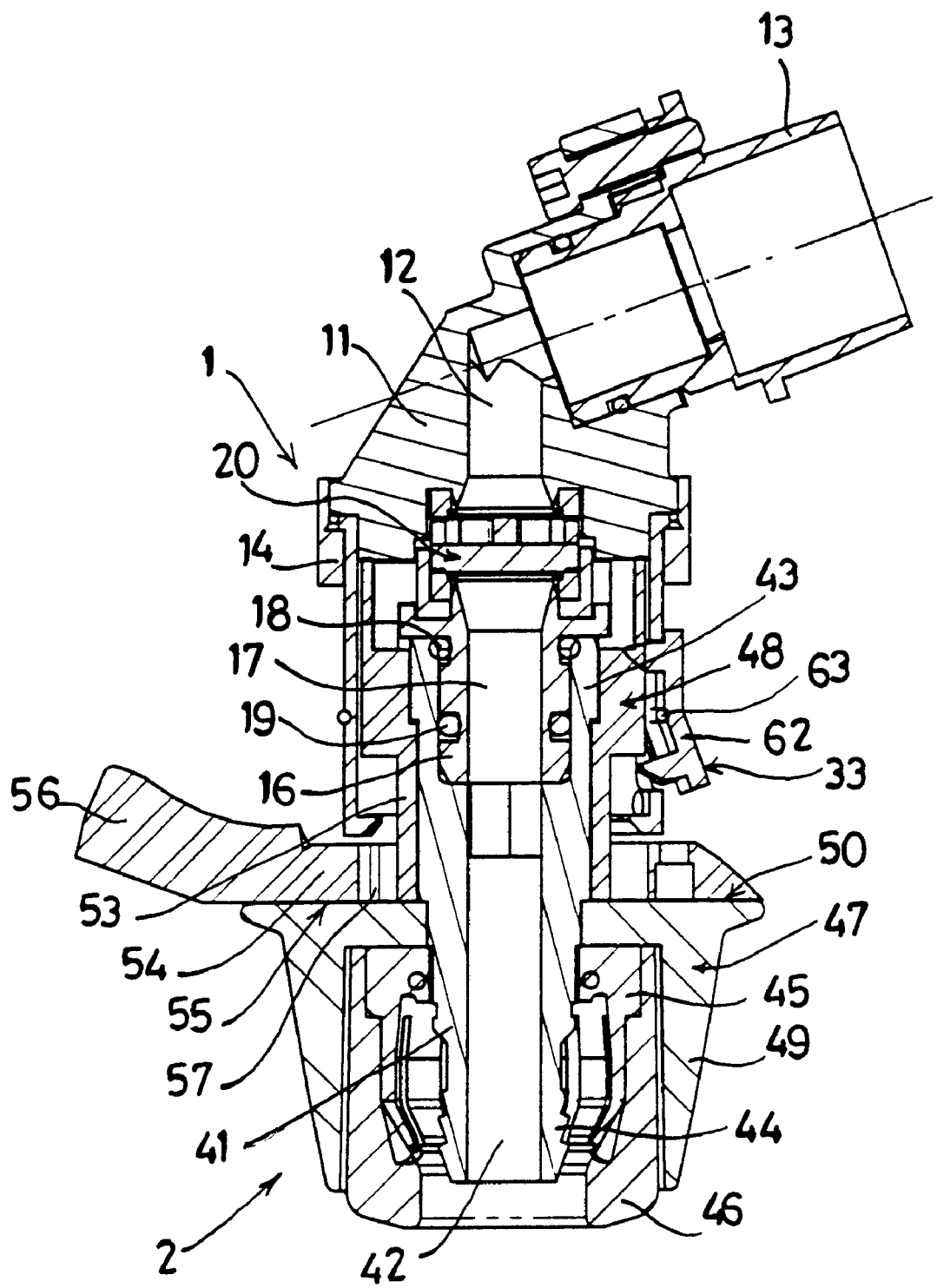
FIG. 3 shows a longitudinal section through the coupling shown in FIG. 1, on line III—III in FIG. 2, without the cover cap.
Figure 4:
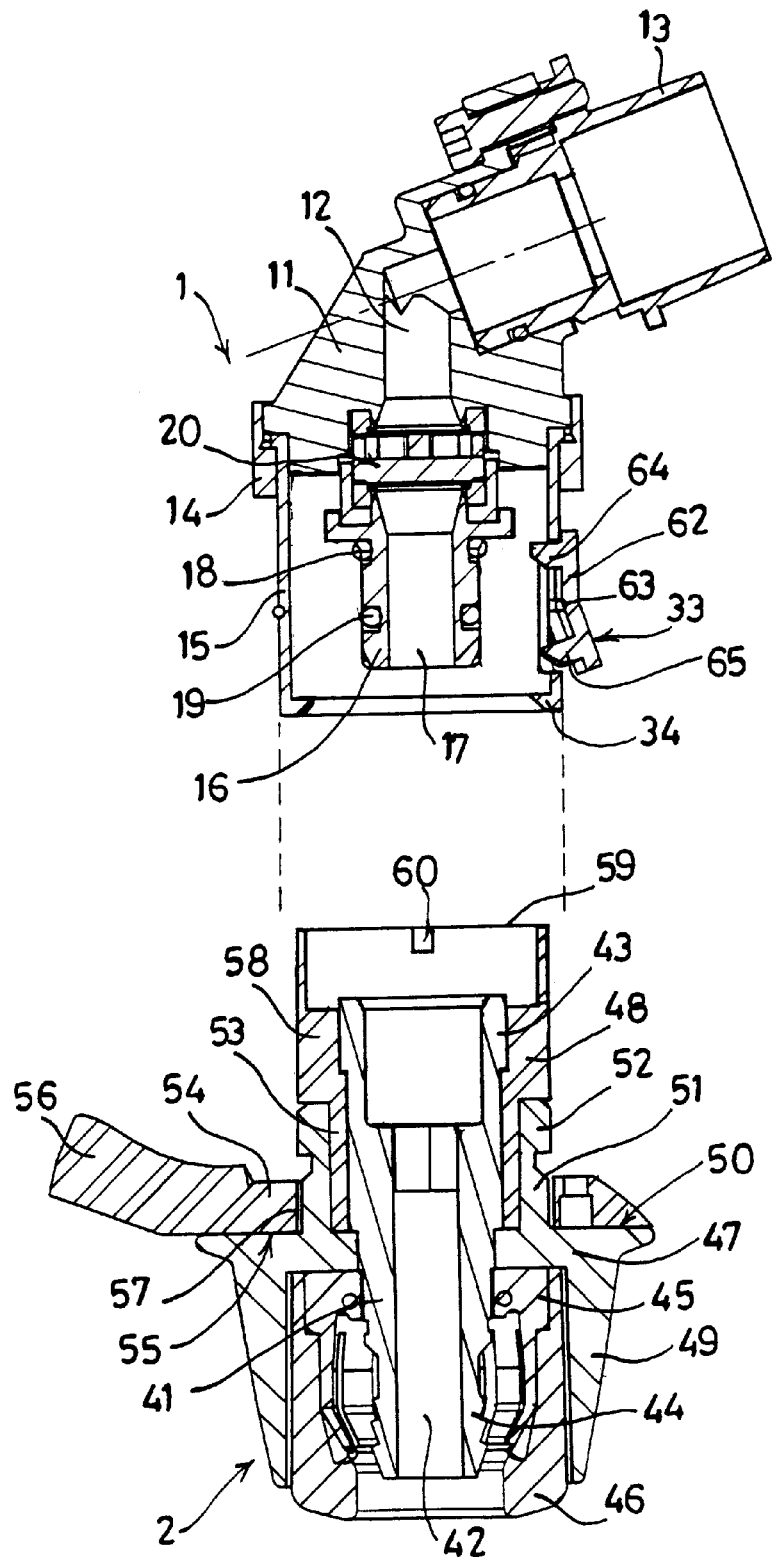
FIG. 4 shows the two coupling parts of the coupling shown in FIG. 1, separated from one another and in section in accordance with FIG. 3.

In the coupled position of the two coupling parts 1 and 2, which is illustrated in FIG. 3, the second locking member 47 can be rotated, in such a manner that the locking projections 52 of the first locking member 47 engage behind the locking edge 34 of the first locking member 15. The second locking member 47 can be rotated between an unlocked position, in which the two coupling parts 1 and 2 can be separated from one another and can be pushed into one another, and a locked position, in which the two coupling parts 1 and 2 are coupled to one another and are completely locked together in the axial direction. During this movement, the second locking member 47 passes through an intermediate position, in which the two coupling parts 1 and 2 are coupled together and the mutual locking is just active. The locking members 15 and 47 thus act as a type of bayonet coupling.

The second locking member 47 and the actuating member 48 are formed in such a manner that the through passage 12, 17 in the first coupling part 1 can only be opened by the shut-off means 20 when the second locking member 47 is situated in the intermediate position or the locked position or between these positions. This is achieved by means of the position and the shape of the fingers 51 of the first locking member 47 and the slots 57 in the flange 55 of the actuating member 48. The shape and the position of the fingers 51 and the slots 57 is also such that the second locking member 47 can only be moved from the intermediate position into the unlocked position when the actuating member 48 and the shut-off means 20 are in a position in which the through passage 12, 17 in the first coupling part 1 is shut off.

The locking means may, as an alternative to the bayonet form, also be of some other type, for example a screw type.

As will be clear from the preceding description and the figures, the second locking member 47 and the actuating member 48 for the shut-off means 20 can be actuated separately. As a result, the locking function and the shut-off function of the coupling are separate from one another, a fact which provides considerable advantages.

In a particular preferred embodiment of the coupling described, the actuating member 48 can only be actuated, i.e. rotated, when the second locking member 47 is in the locked position, in which the two coupling parts 1 and 2 are completely locked with respect to one another. The second locking member 47 is then rotated through approximately a quarter turn with respect to the unlocked position. This is achieved by means of the above mentioned blocking member 33 which forms part of first blocking means.

The blocking member 33 is formed by a tilting block 62 which is arranged on the outside of the bush-like locking member 15 and is able to tilt about an axis 63. The tilting block 61 is provided with two projections 64 and 65 which extend from the tilting block 62, through an opening 66 in the wall of the bush 15, into the inside of the bush 15. The projection 64 interacts with the bush 53 of the actuating member 48, and the projection 65 interacts with the locking projection 52 on one of the fingers 51 of the second locking member 47.

The way in which the blocking is brought about by means of the blocking member 33 will be explained in more detail with reference to FIGS. 7–9, which show a diagrammatic longitudinal section (FIG. 7) and cross section (FIG. 8) through the locking means and the actuating means, and a perspective view of the tilting block 61 (FIG. 9).

In FIG. 9, it can be seen that the projection 64 of the tilting block 62 is effectively offset at a slight angle, in the circumferential direction of the first locking member 15, with respect to the projection 65, owing to the fact that the projection 64 has, on one side, an end face 71 which is inclined in relation to the radial direction, and the projection 65 has a similar inclined end face 72 on the other side.

When the second coupling part 2 is fitted into the first coupling part 1, the ribs 58 on the bush 53 on the actuating member 48 lying in line with the locking projections 52 on the fingers 51 of the second locking member 47 in the cutouts 61 of the locking edge 34, the tilting block 62 is in a position in which only the end section 73 of the projection 65 is resting on the locking projection 52a of one of the fingers 51. In this position, which is illustrated in FIG. 7, the projection 65 is therefore tilted outwards. In this position of the tilting block 62, the projection 64 is tilted inwards and its inclined end face 71 bears against the side of the rib 58a, on the bush 53, which lies in line with the locking projection 52a in question. In this position, in which the second locking member 47 is in the unlocked position, the actuating member 48 cannot be rotated, since it is blocked, on the one hand, by the projection 64 and also by the fingers 51 of the locking member 47, which fit through the slots 57 in the flange 54 of the actuating member 48, and, on the other hand, by a projection or the like which is arranged in the first coupling part 1 but is not shown in more detail.

When the second locking member 47 is rotated from the unlocked position to the locked position, the locking projection 52a moves past the projection 65. During this movement, the actuating member 48 remains blocked by the projection 64. In the locked position, the second locking member 47 has been rotated so far with respect to the unlocked position that the locking projection 52a has moved past the inclined end face 72 of the projection 65. The tilting block 62 can now tilt and the projection 65 can tilt inwards. This means that in this position the actuating member 48 can be rotated, during which process, in the first instance, the rib 58a of the actuating member 48 moves over the inclined end face 71 of the projection 64, this projection 64 being tilted outwards, and consequently the projection 65 being tilted inwards.

With the projection 65 tilted inwards, the inclined end face 72 of this projection 65 blocks the locking projection 52a of the second locking member 47. The second locking member 47 then cannot be rotated out of the locked position (see FIG. 8).

In the locked position of the second locking member 47, the actuating member 48 can rotate freely, within a defined range, in order, by means of the shut-off means 20, to open and shut off the through passage 12, 17 in the first coupling part 1. In the position of the actuating member 48 in which the through passage 12, 17 is completely open, the rib 58a of the actuating member 48 is in a position which is such that the end section 74 of the projection 64 rests against the rib 58a.

The second locking member 47 can only be rotated out of the locked position when the actuating member 48 is in the position in which the through passage 12, 17 is shut off and the rib 58a releases the projection 64 so that it can move inwards. When the second locking member 47 is rotated out of the locked position, the locking projection 52a moves along the inclined end face 72 of the projection 65 which, as a result, is tilted outwards. At the same time, the projection 64 tilts inwards and blocks the actuating member 48 again.

Using the blocking member 33 ensures optimum safety because, on the one hand, the through passage 12, 17 can only be opened when the two coupling parts 1 and 2 are completely locked with respect to one another and, on the other hand, the locking means 47, 15 can only be moved into the unlocked position, in which the coupling parts 1 and 2 can be separated from one another, when the through passage 12, 17 is shut off.

The first blocking means may also be designed in a different manner from that described above in order to carry out the blocking function described above.

In a further preferred embodiment, the coupling according to the invention is provided with second blocking means which ensure that, when coupling parts 1 and 2 are not coupled together, the second locking member 47 and the actuating member 48 are blocked in a fixed position with respect to one another in the direction of rotation, namely the position in which the locking projections 52 on the fingers 51 of the second locking member 47 are in line with the ribs 58 on the actuating member 48. These blocking means are illustrated in FIG. 10.

Figure 10:
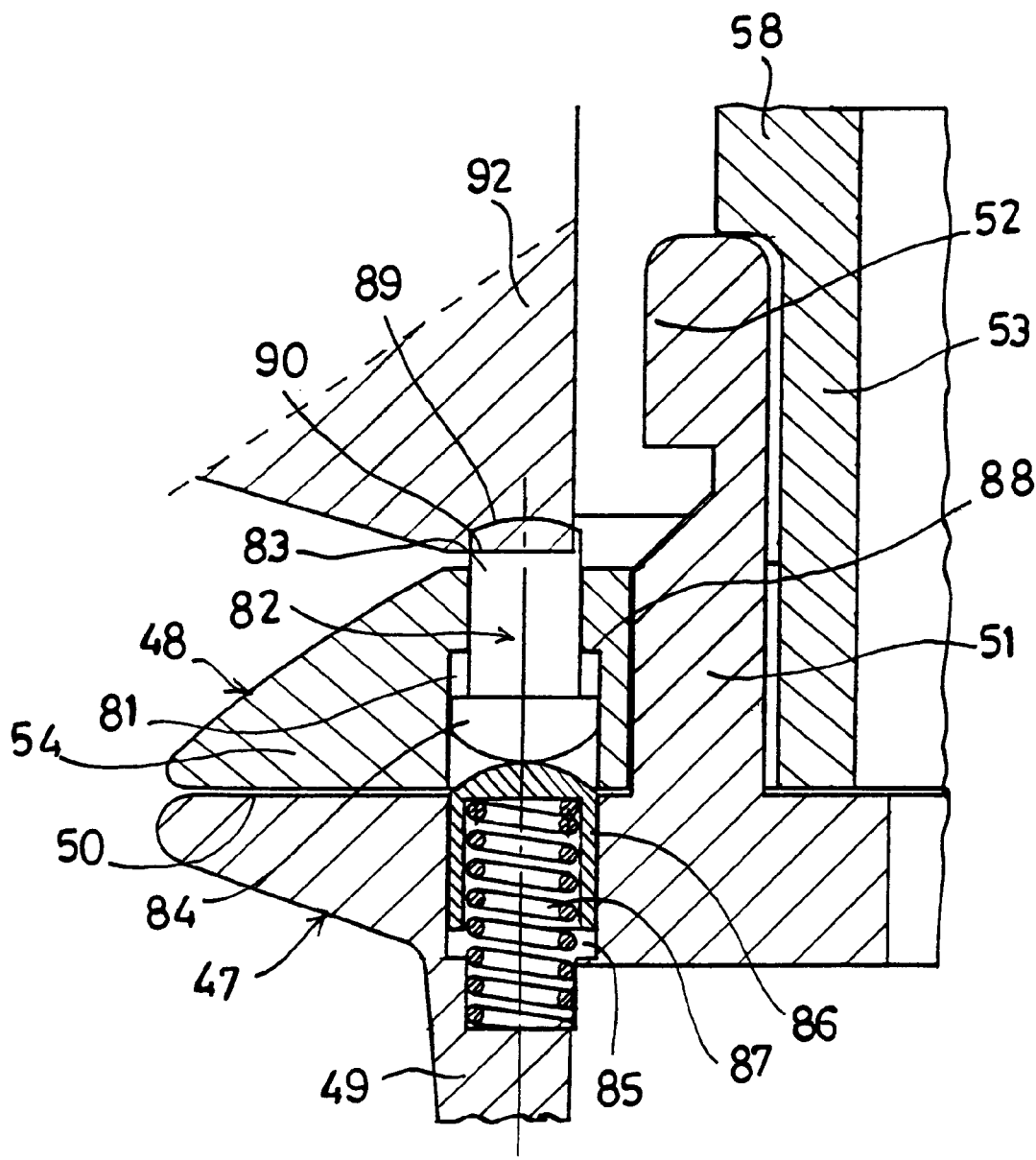
FIG. 10 shows second blocking means of the coupling shown in FIG. 1.

The blocking means illustrated in FIG. 10 comprise a pin 82 which is arranged in a stepped axial bore 81 in the flange 54 of the actuating member 48. The pin 82 has a shank 83 and a head 84 of larger diameter than the shank 83. The head 84 of the pin 82 lies on the side of the second locking member 47. A blind bore 85, which is open in the direction of the flat end face 50, is arranged in the second locking member 47, in which blind bore there is arranged a hollow pin 86 which is pressed towards the flange 54 of the actuating member 48 by means of a compression spring 87 which is located between the pin 86 and the bottom of the blind bore 85.

When the locking projections 52 and the ribs 58 are in line with one another, the bores 81 and 85 lie opposite one another. The diameter of the bore 85 is in principle equal to the diameter of the adjoining part of the bore 81. By the spring 87, the hollow pin 86 is pressed into the bore 81 and onto the head 84 of the pin 82. This head 84 comes to bear against the stop 88 in the bore 81. The pin 86 thus blocks the second locking member 47 with respect to the actuating component 48 in the direction of rotation.

When the second coupling part 2 is fitted into the first coupling part 1, at a given moment the end face 89 of the pin 82 comes into contact with an edge 90 of a cap 91 which is placed over the first coupling part (see FIG. 1). As the second coupling part 2 is pushed further inwards, the pin 82, and consequently the pin 86, will be pressed back counter to the force of the spring 87. In the coupled position of the two coupling parts 1 and 2, the pins 82 and 86 are pressed back so far so that the plane of contact between the two pins substantially coincides with the end face 50 of the locking member 47. The second locking member 47 and the actuating member can then be rotated with respect to one another. The pins 82 and 86 function in the same way as the lock pins in a cylinder lock.

The invention is not limited to the embodiments described above and illustrated in the drawing. Other embodiments of the shut-off means, the actuating means, the locking means and the various blocking means are possible within the scope of the appended claims. It is also possible to arrange shut-off means in both coupling parts. Furthermore, it is possible to arrange the female pipe connection part in the first coupling part and the male pipe connection part in the second coupling part.

What is claimed is:

1. A coupling for connecting a first pipe part and a second pipe part, comprising a first coupling part which is to be connected to the first pipe part and a second coupling part which is to be connected to the second pipe part, which two coupling parts each have a through passage and can be coupled together in order to bring about a releasable connection between the coupling parts, such that the through passages in the coupling parts adjoin one another coaxially, and further comprising:

shut-off means, which is arranged in at least one of the two coupling parts, for opening and shutting off the through passage in the coupling part in question, locking means comprising a first locking member, which is arranged in the first coupling part, and a second locking member, which is arranged in the second coupling part, which locking members are able to interact with one another in order to lock the two coupled-together coupling parts in the axial direction with respect to one another, and are able to move with respect to one another between an unlocking position, in which the two coupling parts can be separated from one another, and a fully locking position, in which the two coupling parts are coupled together and are fully locked together in the axial direction, via an intermediate position, in which the two coupling parts are coupled together and the locking members are in a locking position close to the unlocking position, actuating means, which are arranged in at least one of the two coupling parts, for actuating the shut-off means, the locking means and the actuating means being provided with cooperating parts such that the through passage in that coupling part in which the shut-off means is arranged can only be opened by means of the actuating means and the shut-off means when the locking means is in the intermediate position or the fully locking position or between these positions, and the locking members can only be moved out of the intermediate position into the unlocking position when the actuating means and the shut-off means are in the position in which the through passage in the coupling part in which the shut-off means is arranged is shut off, and wherein the actuating means and the locking means can be actuated separately.

2. The coupling of claim 1, wherein the actuating means can only be actuated when the locking members means are in the fully locking position.

3. The coupling of claim 1, wherein the coupling is provided with a blocking means which is designed such that the locking members can only be moved out of the fully locking position when the actuating means and the shut-off means are in the position in which the through passage in the coupling part in which the shut-off means is arranged is shut off.

4. The coupling of claim 1, wherein the second coupling part is provided with a blocking means which, in the uncoupled position of the coupling, blocks movement of the second locking member with respect to the actuating member and, in the coupled position of the coupling, allows this movement.

5. The coupling of claim 1, wherein the first coupling part can be fixed to a wall.

* * * * *